United States Patent [19]

Kackenmeister et al.

[11] Patent Number: 4,478,571
[45] Date of Patent: Oct. 23, 1984

[54] PHOTOFLASH ARRAY HUMIDITY PROTECTED SWITCHES

[75] Inventors: Carl F. Kackenmeister, Williamsport; Gary L. Houseknecht, Hughesville, both of Pa.

[73] Assignee: GTE Products Corporation, Stamford, Conn.

[21] Appl. No.: 423,587

[22] Filed: Sep. 27, 1982

[51] Int. Cl.³ .............................................. F21K 5/02
[52] U.S. Cl. ........................................ 431/359; 362/6; 362/11; 362/15
[58] Field of Search ....................... 431/359, 362, 365; 362/4, 6, 11, 15

[56] References Cited

U.S. PATENT DOCUMENTS

| | | | |
|---|---|---|---|
| 3,458,270 | 7/1969 | Ganser et al. | 431/359 |
| 3,728,067 | 4/1973 | DeGraaf et al. | 431/359 |
| 3,951,582 | 4/1976 | Holub et al. | 431/359 |
| 3,969,065 | 7/1976 | Smialek | 431/359 |
| 3,969,066 | 7/1976 | Smialek et al. | 431/359 |
| 3,990,833 | 11/1976 | Holub et al. | 431/359 |
| 4,080,155 | 3/1978 | Sterling | 431/359 |
| 4,087,233 | 5/1978 | Shaffer | 431/359 |
| 4,136,376 | 1/1979 | Green et al. | 431/359 |
| 4,182,607 | 1/1980 | Collins et al. | 431/359 |
| 4,182,608 | 1/1980 | Chevali et al. | 431/359 |
| 4,240,786 | 12/1980 | Heytmeijer | 431/359 |
| 4,261,773 | 4/1981 | Sterling | 431/359 |
| 4,299,558 | 11/1981 | Pinkasovich | 431/359 |
| 4,320,440 | 3/1982 | Brower et al. | 431/359 |
| 4,330,821 | 5/1982 | Brower et al. | 431/359 |
| 4,334,856 | 6/1982 | Broadt et al. | 431/359 |
| 4,336,570 | 6/1982 | Brower et al. | 362/11 |
| 4,379,690 | 4/1983 | Kling et al. | 431/359 |
| 4,388,606 | 6/1983 | Shaffer et al. | 431/359 |

OTHER PUBLICATIONS

Brandrup, J. et al., Polymer Handbook–2nd edition, New York, Wiley Interscience Publishers, (1975), p. 8–5.

Primary Examiner—James C. Yeung
Assistant Examiner—Helen Ann Odar
Attorney, Agent, or Firm—Thomas H. Buffton

[57] ABSTRACT

A moisture barrier for radiation-responsive switches which includes an admixture of particles and forms a part of a multilamp photoflash array comprises a thin, radiation-transparent and/or translucent coating which is absorbed into the switches and envelopes the individual particles of the admixture.

8 Claims, 3 Drawing Figures

PHOTOFLASH ARRAY HUMIDITY PROTECTED SWITCHES

TECHNICAL FIELD

This invention relates to photoflash arrays which include radiation-responsive switches and more particularly to photoflash arrays wherein a moisture barrier is provided for radiation-responsive switches of the array.

BACKGROUND ART

Photoflash arrays normally include a plurality of flashlamps affixed to a circuit board. A printed circuit on the circuit board is electrically connected to the flashlamps and to a source of potential. The potential or energizing source may be of the so-called high voltage type wherein a voltage in the range of about 2000 volts is available or of the low voltage type wherein the voltage provided is in the range of about 3 to 15 volts. Also, the array normally includes a plurality of radiation-responsive switches positioned adjacent the flashlamps and electrically connected into the printed circuit. Often these radiation-responsive switches are of the normally open (N/O) type and respond to radiation from a nearby flashlamp to provide an electrically conductive path.

One of the problems encountered in photoflash arrays and particularly in arrays having severely restricted space limitation on the distances separating the components of the array is a tendency toward defects due to humidity. When the arrays, which normally include radiation-responsive switches, are subjected to humid or tropical conditions wherein moisture condensation is encountered, the moisture tends to undesirably react with the switch material. Unfortunately, the reaction to this undesired moisture is to provide a conductive path or defective array since the conductive path is in response to moisture rather than radiation from a flashlamp. Thus, the trend toward arrays of smaller size and increased components undesirably decreases the spacing and increases the susceptibility to defects due to humidity.

One known attempt to reduce the effects of humid conditions on flashlamp arrays and particularly those which include convertible switches is suggested in U.S. Pat. No. 4,136,376, issued Jan. 29, 1979. Therein, a photoflash array includes a plurality of switches responsive to a relatively high voltage source. A coating of electrically insulative adhesive is applied to and covers the switches in order to prevent short circuits due to moisture. However, it appears that such electrical adhesive responsive to relatively high voltages is an acceptable material only so long as openings are provided for electrical termination and the coating only covers the switch devices.

Another known suggestion for reducing the effects of humidity on a switch is set forth in U.S. Pat. No. 3,969,065, issued July 13, 1976. Therein, a cupric oxide material is employed in conjunction with an organic binder. The conversion of the cupric oxide to copper with the accompanying combustion of the organic binder improved the resistance of the array to high humidity. Thus, a copper salt activity is relied upon for humidity control.

Still another technique for controlling the effects of humidity on a switch arrangement is set forth in U.S. Pat. No. 3,951,582, issued Apr. 20, 1976. Therein, a light absorbing heat transmitting coloring agent and a resin and solvent are utilized to provide a protective switch coating. Moreover, a U.S. patent application bearing U.S. Ser. No. 332,899, filed Dec. 17, 1981 and assigned to the Assignee of the present application, suggests a humidity-protective system which includes titanium dioxide and a binder of blended polystyrene and a thermoplastic.

Although each of the above-mentioned suggestions and materials have provided protection against humid conditions, it has been found that there is something still to be desired insofar as moisture barriers for arrays having relatively closely spaced components are concerned. Moreover, arrays responsive to relatively low voltage sources wherein switch conversion necessitates especially low resitance values are particularly susceptible to humid conditions.

OBJECTS AND SUMMARY OF THE INVENTION

An object of the present invention is to improve the resistance to humidity of a multilamp photoflash array. Another object of the invention is to enhance the switching capabilities of a multilamp photoflash array. Still another object of the invention is to provide an improved moisture barrier coating for a multilamp photoflash array having switches therein. A further object of the invention is to provide an improved moisture-barrier coating for low-voltage responsive switches of a multilamp photoflash array.

These and other objects, advantages and capabilities are achieved in one aspect of the invention by a moisture barrier for switches of a multilamp photoflash array wherein a thin radiation-transparent or translucent coating is absorbed into and envelopes the individual particles of an admixture forming the switches of the array. In another aspect of the invention, a multilamp photoflash array includes a plurality of flashlamps affixed to an electrical circuit which includes radiation-responsive switches. Each of the switches includes an admixture of particles, and a moisture barrier coating of radiation-transparent or translucent material is absorbed into the switches and envelopes the particles of the admixture.

BEST MODE FOR CARRYING OUT THE INVENTION

For a better understanding of the present invention, together with other and further objects, advantages and capabilities thereof, reference is made to the following disclosure and appended claims in conjunction with the accompanying drawings.

Figure 1:
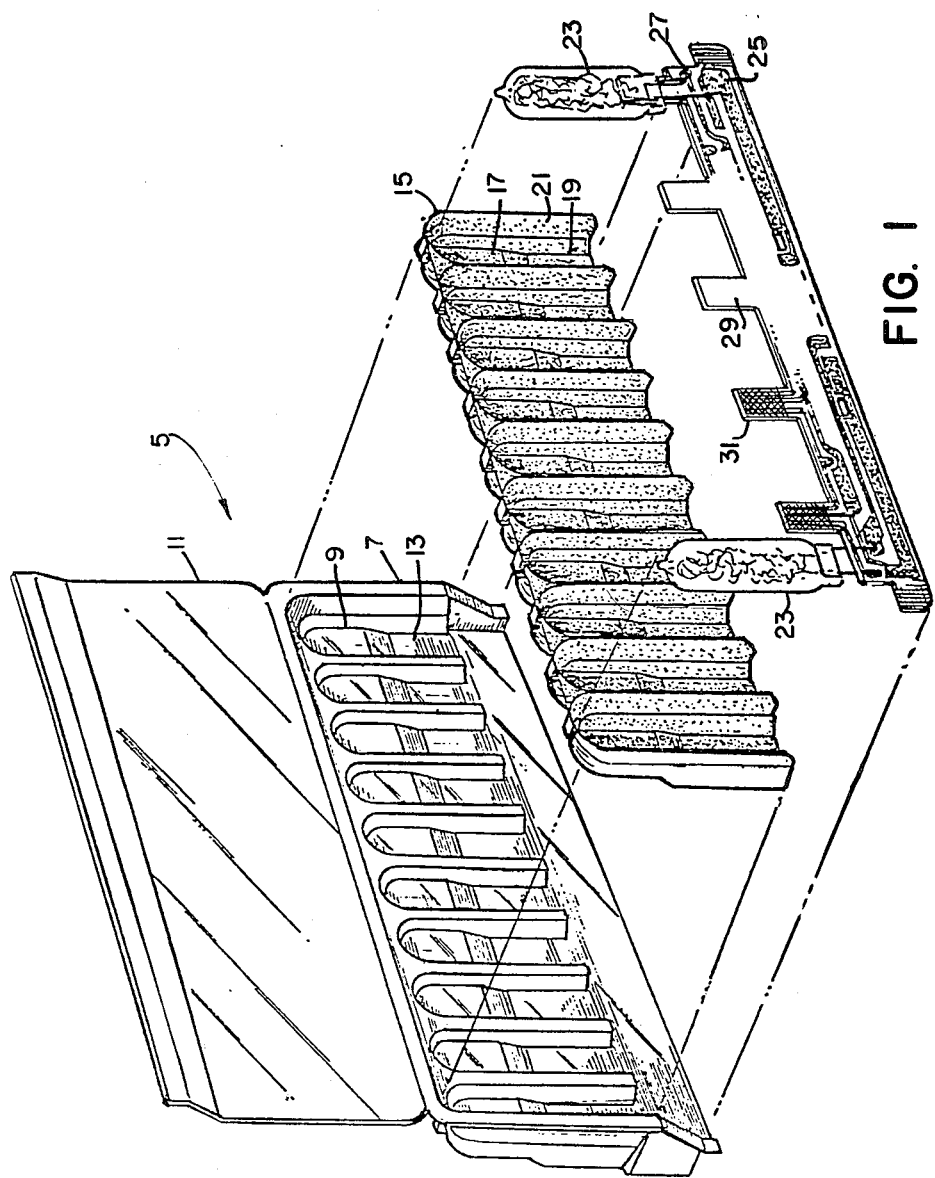
FIG. 1 is an exploded elevational view of a preferred form of multilamp photoflash array employing switches utilizing a moisture barrier coating of the invention.

Referring to FIG. 1 of the drawings, a multilamp photoflash array includes a plastic housing member 5 having a back portion 7 with a plurality of spaced cavities 9. The housing member 5 also has a light transmittable front portion 11 which is foldable to provide an enclosure for the cavities 9. Moreover, each of the cavities 9 of the housing member 5 includes an off-set portion 13 which will be explained hereinafter.

Formed for deposition within the cavities 9 of the housing member 5 is a reflector unit 15 having a plurality of cavities 17 each having an off-set portion 19. Each of these cavities 17 include a reflective surface 21 and is formed to nest within the cavities 9 of the housing member 5.

A plurality of flashlamps 23 are each affixed to an electrical circuit 25 attached to a circuit board 27. Each of the flashlamps 23 is formed for deposition within one of the cavities 17 of the reflector unit 15 which, in turn, is formed to nest in the cavities 9 of the back portion 7 of the housing member 5. The circuit board 27 includes a plurality of tab members 29 and each of the tab members 29 includes a switching means 31 thereon and is formed for deposition within the off-set portion 19 of the reflector unit 15.

Figure 2:
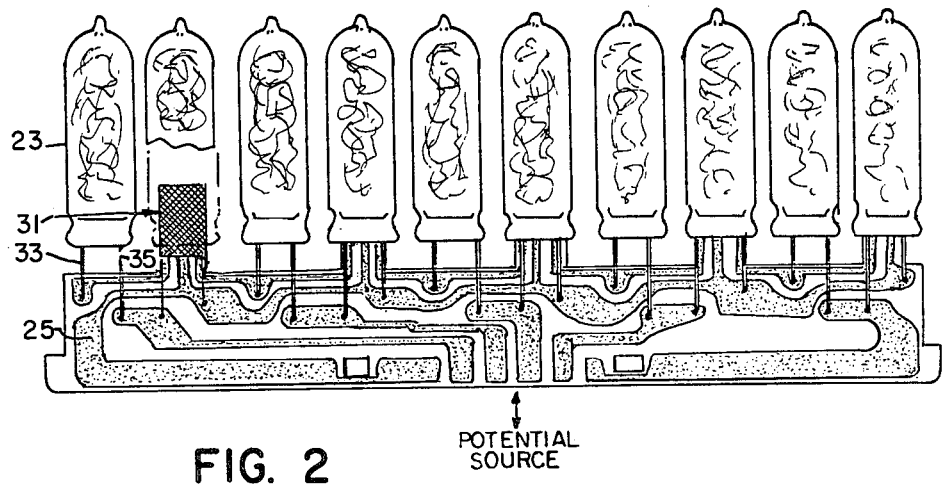
FIG. 2 is an elevational view of an integrated electrical circuit having lamp connections and utilizing a switch with a moisture barrier coating of the invention.
Figure 3:
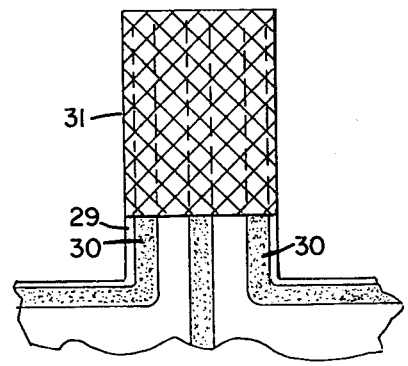
FIG. 3 is an enlarged view of a moisture-barrier coating switch of the invention.

As can be more clearly seen in FIG. 2 and the enlargement of FIG. 3, each of the flashlamps 23 includes a pair of electrical conductors 33 and 35 which are soldered or otherwise attached to the electrical circuit 25. Also, the electrical circuit 25 is formed for connection to a low potential source, providing a voltage in the range of about 3 to 15 volts, available in a camera (not shown). Moreover, each of the tab members 29 includes electrically conductive runs 30 which are overlayed with a switching means 31 to provide an electrically non-conductive path prior to exposure to radiation from a flashlamp 23 and an electrically conductive path after exposure to radiation.

Also, the switching means 31 which are operable from a relatively low voltage source are convertible to a relatively low resistance value, such as 0.5-ohms or less, for example. Thus, the combination of a low source voltage and the necessity for a low resistance value after conversion requires a relatively low mass in order to achieve the above-mentioned switch conversion. As a result, it has been found that a moisture barrier coating for the switching means 31 must be necessarily very thin in order to avoid the formation of a heat sink mass which would adversely affect switch conversion.

Further, it has been found that the switching means 31 preferably includes an admixture of particles and a preferred admixture includes silver carbonate and/or silver oxide with silver-coated glass beads as a filler material. It has also been found that protection against humidity is maximized if a barrier coating material is selected which is not only absorbed by the switching means 31 but also envelopes the particles of the admixture forming the switching means 31.

Thus, successful barrier coatings are those selected from such materials as petroleum-based waxes, oils and greases as well as polyethylene-based wax and organic polymers, such as silicone rubber and acrylic resin. One especially good moisture barrier material is a petroleum jelly which is absorbed into the switch, envelopes the particles of the admixture and does not harden. Moreover, a preferred material is a commercially available water-displacing, non-hardening, corrosion inhibitor petroleum-based oil known as CRC 2-26 and available from the CRC Chemicals Inc. Company of Warminster, PA 18974.

Tests were conducted employing the above-mentioned CRC 2-26 moisture barrier material, which is a thin petroleum-based oil, on switches of a multilamp photoflash array responsive to a relatively low voltage source. The barrier material, which is applicable by dipping, spraying, wiping and other similar techniques, was applied to the switching means 31 and oven dried. After 14 days exposure to a temperature of 120° F. and 95% relative humidity, there was no unintended switch conversion, and all of the switches functioned in a proper manner.

Additionally, it should further be noted that the switching means 31 preferably includes a binder in the order of about 10% by dried weight. Such binder content is typical and provides a switching means 31 having a porosity suitable for absorbing the barrier coating and enveloping the particles of the admixture.

While there has been shown and described what is at present considered the preferred embodiments of the invention, it will be obvious to those skilled in the art that various changes and modifications may be made therein without departing from the invention as defined by the appended claims.

What is claimed is:

1. A multilamp photoflash array comprising:
   a plurality of flashlamps;
   an electrical circuit connected to said flashlamps and to a source and formed to energize said lamps individually and in sequence; and
   radiation-responsive switches each including an admixture of individual particles of silver carbonate and silver coated glass beads and a binder integrated into said electrical circuit adjacent said flashlamps to receive radiant energy therefrom, each of said switches having a moisture barrier in the form of a thin radiation-translucent coating selecting from the group consisting of petroleum-based oils and waxes, organic polymers and polyethylene-based waxes, absorbed into said switches and enveloping said individual particles of said admixture.

2. The multilamp photoflash array of claim 1 wherein said moisture barrier is in the form of a coating of petroleum jelly.

3. The multilamp photoflash array of claim 1 wherein said moisture barrier is in the form of a water displacing, non-hardening, corrosion inhibitor, thin, petroleum-based oil.

4. The multilamp photoflash array of claim 1 wherein said array is operable from a relatively low voltage source.

5. In a multilamp photoflash array having a plurality of radiation-responsive switches each including an admixture of individual particles of silver oxide and silver-coated glass beads, a binder and a moisture barrier for said switches comprising a thin radiation-transparent coating selected from the group consisting of petroleum-based oils and waxes, organic polymers and polyethlene-based waxes absorbed into said switches and enveloping said individual particles of said admixture.

6. The moisture barrier of claim 5 wherein said coating is in the form of a petroleum jelly.

7. The moisture barrier of claim 5 wherein said coating is in the form of petroleum-based oil.

8. The moisture barrier of claim 5 wherein said coating is in the form of an acrylic resin.

* * * * *